UNITED STATES PATENT OFFICE.

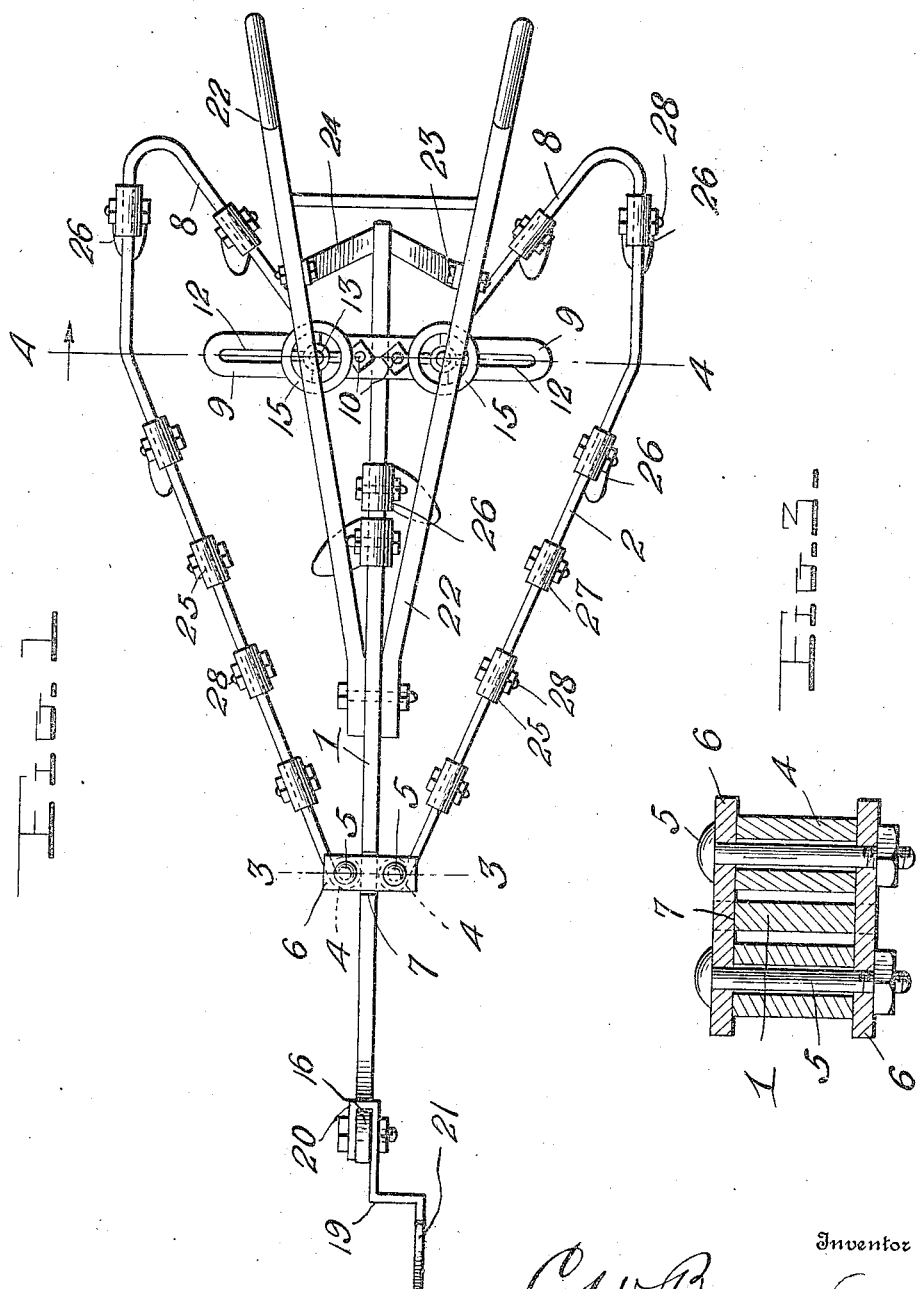

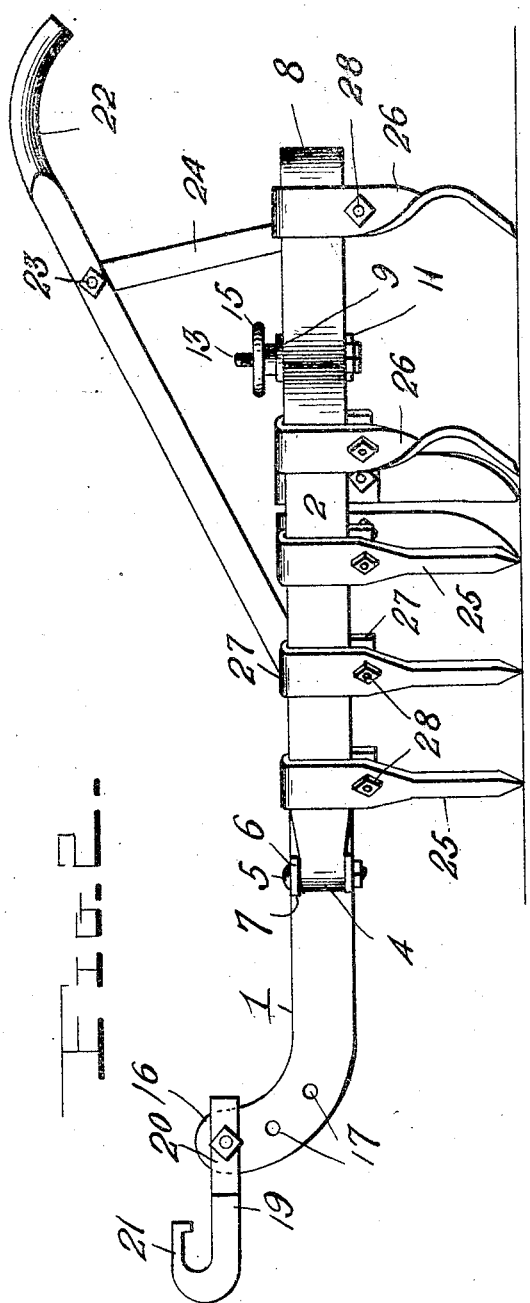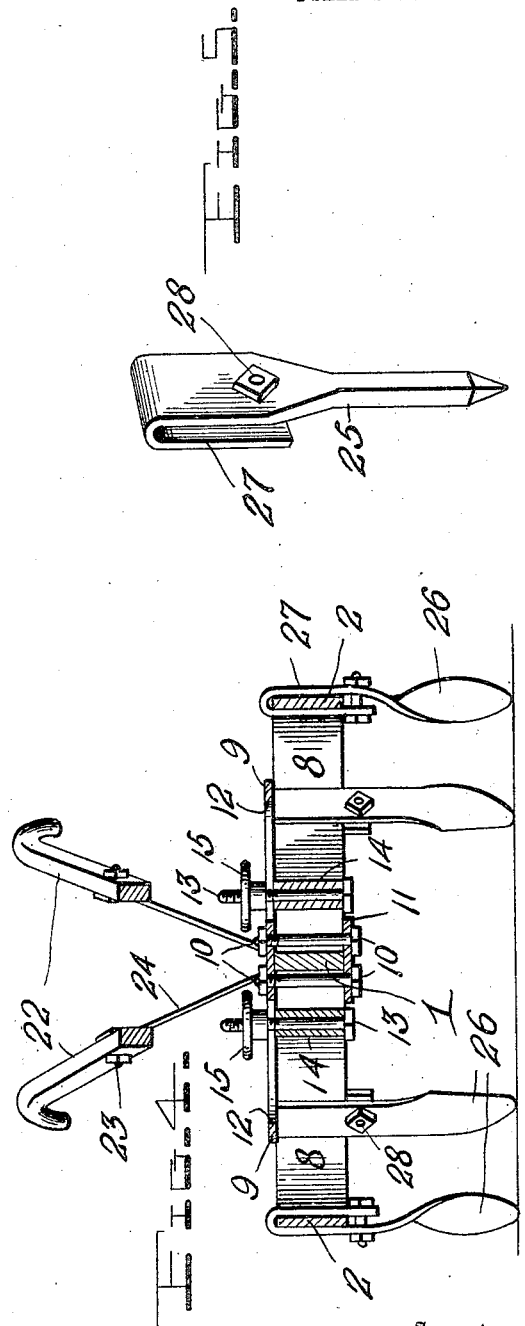

CRAIG WHITMEL BROWN, OF LEWISTON, NORTH CAROLINA.

CULTIVATOR.

942,540.   Specification of Letters Patent.   Patented Dec. 7, 1909.

Application filed May 20, 1909. Serial No. 497,218.

*To all whom it may concern:*

Be it known that I, CRAIG WHITMEL BROWN, a citizen of the United States, residing at Lewiston, in the county of Bertie and State of North Carolina, have invented certain new and useful Improvements in Cultivators, of which the following is a specification, reference being had to the accompanying drawings.

This invention relates to improvements in cultivators and similar agricultural implements.

The object of the invention is to provide an implement of this character which will be simple, strong, durable and comparatively inexpensive in construction and the parts of which may be quickly and conveniently adjusted to render it effective on various kinds of soil and to adapt it to a variety of uses.

With the above and other objects in view, the invention consists of the novel features of construction and the combination and arrangement of parts hereinafter fully described and claimed, and illustrated in the accompanying drawings, in which—

Figure 1 is a plan view of the improved cultivator; Fig. 2 is a side elevation; Figs. 3 and 4 are detail sections taken, respectively, on the planes indicated by the lines 3—3 and 4—4 in Fig. 1, and Fig. 5 is a perspective view of one of the cultivator teeth.

The body or frame of my improved cultivator comprises a centrally arranged and longitudinally extending main beam 1 and two rearwardly diverging side beams 2, the converging forward ends of which are hingedly united to the beam 1 so that said side beams may be adjusted laterally or horizontally to vary the width of the frame. Said beams 1, 2 are preferably constructed of metal bars or straps and the hinge or pivotal connection may be effected, as shown more clearly in Fig. 3, by bending the front ends of the beams 1 upon themselves to form eyes 4 which receive vertical bolts or similar fastenings 5 passing through upper and lower transverse plates 6. The latter extend across the front portion of the beam and are seated in transverse notches 7 formed in the top and bottom edges of said beam.

The rear portions of the side beams 2 are preferably bent inwardly and forwardly, as shown at 8, and they are longitudinally adjustable on a transverse connecting member or bar 9 which is in turn longitudinally adjustable on the rear portion of the beam 1. Said connecting member 9 is in the form of a bar having its central portion adjustably secured to the beam 1 by a clip consisting, preferably, of upright bolts 10 disposed on opposite sides of the beam 1 and passing through openings in the bar 9 and a lower cross bar or plate 11, as shown more clearly in Fig. 4 of the drawings. The projecting ends of the connecting bar or member 9 are formed with longitudinal slots 12 for the reception of slidable clamping bolts 13 which also pass through eyes 14 formed by bending the extremities of the angular rear portions 8 of the side beams. Nuts in the form of hand wheels 15 are arranged on the upper threaded ends of the bolts 13 for the purpose of effectively clamping the eyes 14 against the slotted ends of the bar 9. It will be seen that when the bolts 10 and 13 are loosened the connecting bar 9 may be moved forwardly or rearwardly on the beam 1 and the side bars 2 outwardly or inwardly with respect to said beam 1, thereby making the implement as wide or as narrow as may be necessary for the work to be performed by the earth working implements carried on said beams, as presently explained.

The front end of the main beam 1 is curved upwardly to provide a clevis hook 16 formed with a vertical series of apertures 17 in any one of which may be inserted a fastening pin or bolt for a draft link or connection 19. As illustrated, said link has a U-shaped rear end 20 which extends around the clevis arm 16 and receives the fastening 18, and it also has an angularly bent forward end 21 with which a draft tree may be engaged.

22 denotes upwardly and rearwardly inclined handles having their converging forward ends secured on opposite sides of the beam 1 by an intermediate portion of the beam 1 by a transverse bolt or other fastening 23. The diverging rear portions of the handles are spaced apart by a cross bar and they are braced by braces 24 extending upwardly from the rear end of the beam 1.

While any kind of cultivator teeth or shovels or other earth working devices may be applied to the beams 1, 2, I preferably provide upon the forward portions of the side beams 2 cultivator teeth 25 and upon the rear portions of all three of said beams cultivator teeth or shovels 26. The front teeth 25 are each formed from a metal strap having its upper end 27 bent upon itself or into U-shape to straddle one of the beams 2 and having its lower end extended and pointed, as shown. Such tooth is longitudinally slidable on the beam 1 so that it may be adjusted and it is adapted to be retained in adjusted position by a clamping plate 28. The rear cultivator teeth or blades 26 are similarly constructed and adjustably secured to the rear portions of the beams 1, 2 but their lower ends instead of being reduced and formed with straight points are left flat but twisted and shaped to provide V-shaped blades or shovels.

From the foregoing it will be seen that the invention provides a simple and practical implement of this character, the parts of which may be produced at a small cost, will be strong and durable in use, and may be quickly adjusted to adapt the implement to various kinds of soil and for use on crops of various kinds and conditions.

While the preferred embodiment of the invention has been shown and described in detail, it will be understood that various changes in the form, proportion and arrangement of parts and in the details of construction may be resorted to without departing from the spirit and scope of the invention.

Having thus described the invention what is claimed is:

1. An implement of the character described comprising a centrally arranged main beam, rearwardly diverging side beams having their forward ends hingedly connected to the main beam and their rear ends bent inwardly and provided with eyes, earth working elements upon said beams, a transverse connecting bar arranged upon the main beam and having its projecting ends formed with longitudinal slots, a clip adjustably securing the central portion of said connecting bar to said main beam, and clamping bolts arranged in the eyes at the rear ends of the side beams and in the longitudinal slots of said connecting bars, substantially as described.

2. The hereindescribed implement comprising a centrally arranged main beam having its forward end upturned and apertured and its intermediate portion formed in its top and bottom edges with notches, upper and lower apertured plates arranged in said notches, rearwardly diverging side beams having their forward ends bent to form eyes and arranged between said plates and pivot fastenings passed through said plates and the eyes in the side beams to pivotally unite the latter and the main beam, the rear ends of said side beams being bent inwardly and forwardly and having their extremities bent to form eyes, a transverse connecting bar arranged across the rear portion of the main beam and having its projecting ends formed with longitudinal slots, a clip adjustably securing the central portion of the connecting bar to said main beam, clamping bolts arranged in the eyes at the rear ends of the side beams and in the slots of said connecting bars to secure the side beams in adjusted position, earth working elements upon the side and main beams, a pair of upwardly and rearwardly diverging handles secured at their forward ends on opposite sides of the intermediate portion of the main beam, and braces between said handles and the rear end of the main beam.

In testimony whereof I hereunto affix my signature in the presence of two witnesses.

CRAIG WHITMEL BROWN.

Witnesses:
B. F. RENFROW,
U. S. AUSTIN.